(12) United States Patent
Hsu

(10) Patent No.: US 8,374,483 B2
(45) Date of Patent: Feb. 12, 2013

(54) APPARATUS AND METHOD FOR TESTING SIGNAL CHANNELS OF DVR

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 255 days.

(21) Appl. No.: 12/879,016

(22) Filed: Sep. 10, 2010

(65) Prior Publication Data

US 2011/0255843 A1    Oct. 20, 2011

(30) Foreign Application Priority Data

Apr. 20, 2010    (TW) .............................. 99112303 A

(51) Int. Cl.
    *H04N 5/765*    (2006.01)

(52) U.S. Cl. ........ 386/231; 386/230; 386/239; 386/326; 725/80; 725/115; 725/74; 725/81

(58) Field of Classification Search .................. 386/231, 386/230, 239, 326; 725/80, 81, 115, 74
See application file for complete search history.

(56) References Cited

U.S. PATENT DOCUMENTS

| | | | |
|---|---|---|---|
| 6,601,127 B1 * | 7/2003 | Nomura et al. | 710/306 |
| 6,834,374 B1 * | 12/2004 | Sameshima | 715/736 |
| 7,999,580 B2 * | 8/2011 | Tashiro | 327/113 |
| 8,214,863 B2 * | 7/2012 | Kim et al. | 725/74 |
| 2005/0034160 A1 * | 2/2005 | Kim et al. | 725/80 |
| 2005/0166241 A1 * | 7/2005 | Kim et al. | 725/81 |
| 2006/0233228 A1 * | 10/2006 | Liang | 375/222 |
| 2011/0016503 A1 * | 1/2011 | Schaefer et al. | 725/115 |
| 2012/0106928 A1 * | 5/2012 | Hsu | 386/248 |

* cited by examiner

*Primary Examiner* — Helen Shibru
(74) *Attorney, Agent, or Firm* — Altis Law Group, Inc.

(57) ABSTRACT

An apparatus and method can test multiple signal channels of a digital video recorder (DVR). Image data are obtained from a storage device and converted the image data to a video signal. The DVR sends the video signal to an image distributor, and generates a selection command to a controller for controlling the image distributor to select a signal channel to be tested. After the video signal is received from the DVR, the image distributor sends the video signal to the selected signal channel. An ID number of the selected signal channel is displayed on a display device when the DVR does not receive the video signal from the selected video channel.

15 Claims, 2 Drawing Sheets

APPARATUS AND METHOD FOR TESTING SIGNAL CHANNELS OF DVR

BACKGROUND

1. Technical Field

Embodiments of the present disclosure relate generally to signal channels test methods, and more particularly to an apparatus and method for testing multiple signal channels of a digital video recorder (DVR).

2. Description of Related Art

Digital video recorder (DVR) allows a user to record video programs to a recordable medium, and to playback the recorded programs on different multimedia devices, such as televisions or DVD players. Usually, the DVR may have one or more signal channels for transmitting the programs between the DVR and the multimedia devices. To ensure the transmission functions properly, the performance of the signal channels needs be tested.

Performance testing of the signal channels of the DVR can be performed at the factory before the DVR is deployed. Typically, the performance test is performed manually. However, such manual performance tests may be complicated and inefficient. Thus, a need arises to address the above-mentioned problems.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
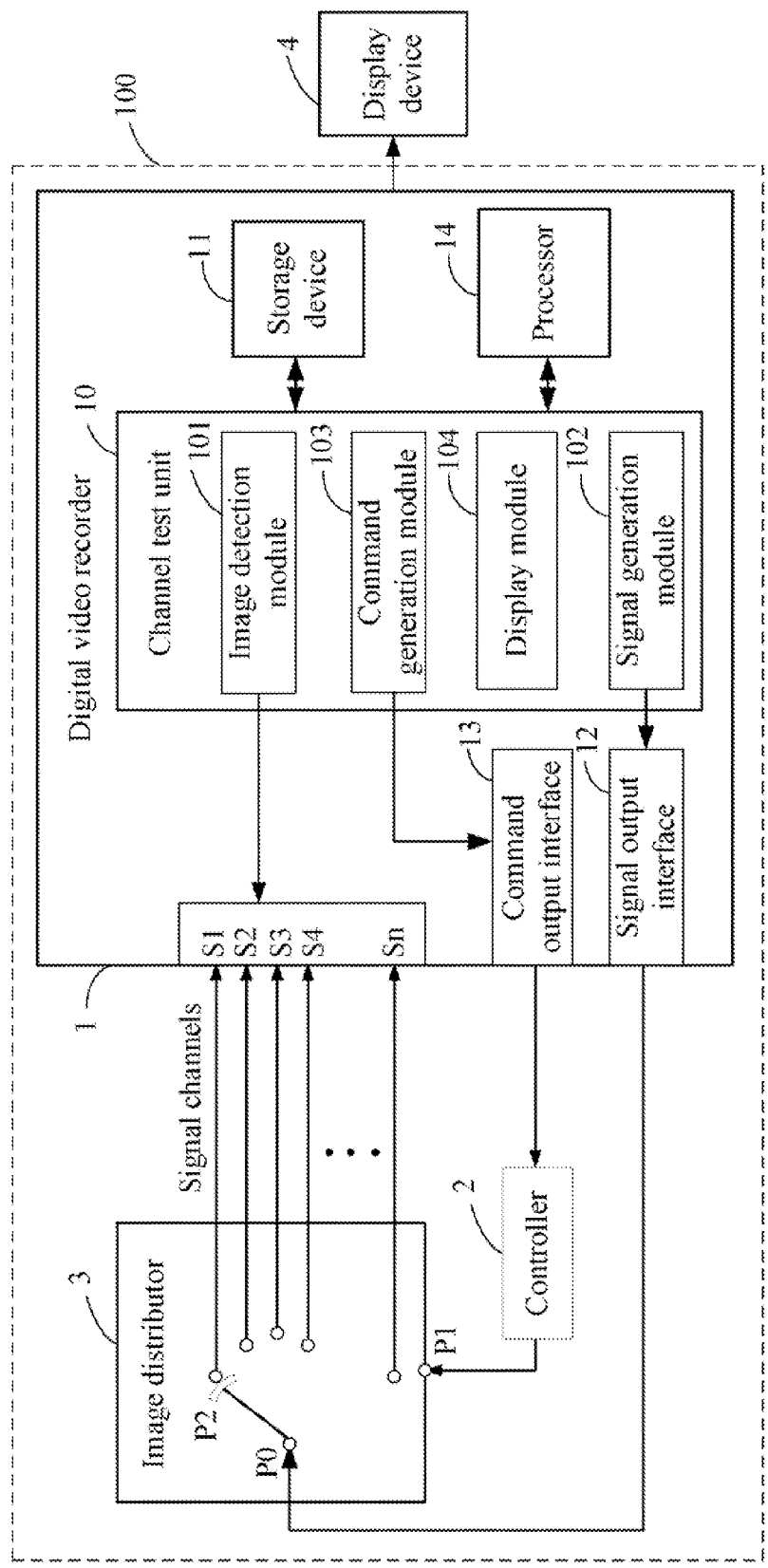
FIG. 1 is a schematic diagram of one embodiment of an apparatus for testing multiple signal channels of a digital video recorder.

FIG. 1 is a schematic diagram of one embodiment of an apparatus 100 for testing signal channels of a digital video recorder (DVR) 1. In the embodiment, the apparatus 100 can test the performance of the signal channels of the DVR 1 using a controller 2 and an image distributor 3, and display an identification (ID) number of a signal channel on a display device 4 when the signal channel cannot perform image transmission function properly. In one embodiment, the DVR 1 includes a channel test unit 10, a storage device 11, a signal output interface 12, a command output interface 13, and at least one processor 14. The DVR 1 connects to the controller 2 through the command output interface 13, and connects to the image distributor 3 through the signal output interface 12. The image distributor 3 connects to the controller 2, and connects to the DVR 1 through a plurality of signal channels. In the embodiment, each of the signal channels is denoted as S1, S2, S3, S4, . . . , and Sn respectively, and is used to transfer video signals from the image distributor 3 to the DVR 1.

The image distributor 3 includes a first input port (denoted as "P0"), a second input port (denoted as "P1"), and a plurality of output ports (denoted as "P2"). The signal output interface 12 connects to the image distributor 3 through the first input port P0. The command output interface 13 connects to the image distributor 3 through the second input port P1. The first input port P0 can be switched to each of the output ports P2 that connects to one of the signal channels. For example, the first input port P0 can be switched to a first signal channels S1, and can also be switched to a second signal channels S2, and so on. In one embodiment, the signal output interface 12 may be a USB interface, and the command output interface 13 may be an RS-232 interface.

The storage device 11 stores image data having different image formats, such as a National television standards committee (NTSC) format, or a phase alteration line (PAL) format. The NTSC format is a television standard defined by a National Television Standards Committee of United States, and the PAL is another television standard defined by Television Standards Committee of Europe. In one embodiment, the storage device 11 may be an internal storage device, such as a random access memory (RAM) for temporary storage of information, and/or a read only memory (ROM) for permanent storage of information. In some embodiments, the storage device 5 may also be an external storage device, such as an external hard disk, a storage card, or a data storage medium.

In one embodiment, the channel test unit 10 includes an image detection module 101, a signal generation module 102, a command generation module 103, and a display module 104. One or more computerized instructions of the function modules 101-104 may be stored in the storage device 11 and executed by the at least one processor 14. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage device.

The image detection module 101 is operable to define an ID number for each of the signal channels of the DVR 1 in sequence, which is denoted by S1, S2, S3, S4, . . . , and Sn respectively, as shown in FIG. 1. The image analysis module 21 is further operable to detect whether the DVR 1 receives a video signal from each of the signal channels, and determine whether all of the signal channels have been tested according to the ID numbers. In one embodiment, the image detection module 101 detects the ID number of the signal channel to determine whether the signal channel has been tested.

The signal generation module 102 is operable to obtain image data from the storage device 11, and convert the image data to a video signal. When the video signal is generated, the signal generation module 102 sends the video signal to the image distributor 3 through the signal output interface 12.

The command generation module 103 is operable to generate a selection command for selecting a signal channel to be tested, and send the selection command to the controller 2 through the command output interface 13. For example, if the first signal channel S1 needs to be tested, the generating module 103 generates a first selection command for selecting the first signal channel S1. If the second signal channel S2 needs to be tested, the generating module 103 generates a second selection command for selecting the second signal channel S2.

The controller 2 controls the image distributor 3 to select a signal channel to be tested from the signal channels according to the selection command. For example, the image distributor 3 selects the first signal channel S1 according to the first selection command, and selects the second signal channel S1 according to the second selection command. After the signal channel is selected, the image distributor 3 sends the video signal to the selected signal channel.

The display module 104 is operable to display the ID number of the selected signal channel on a display device 4 if the DVR 1 does not receive the video signal from the selected signal channel, to indicate that the signal channel cannot perform image transmission function properly.

Figure 2:
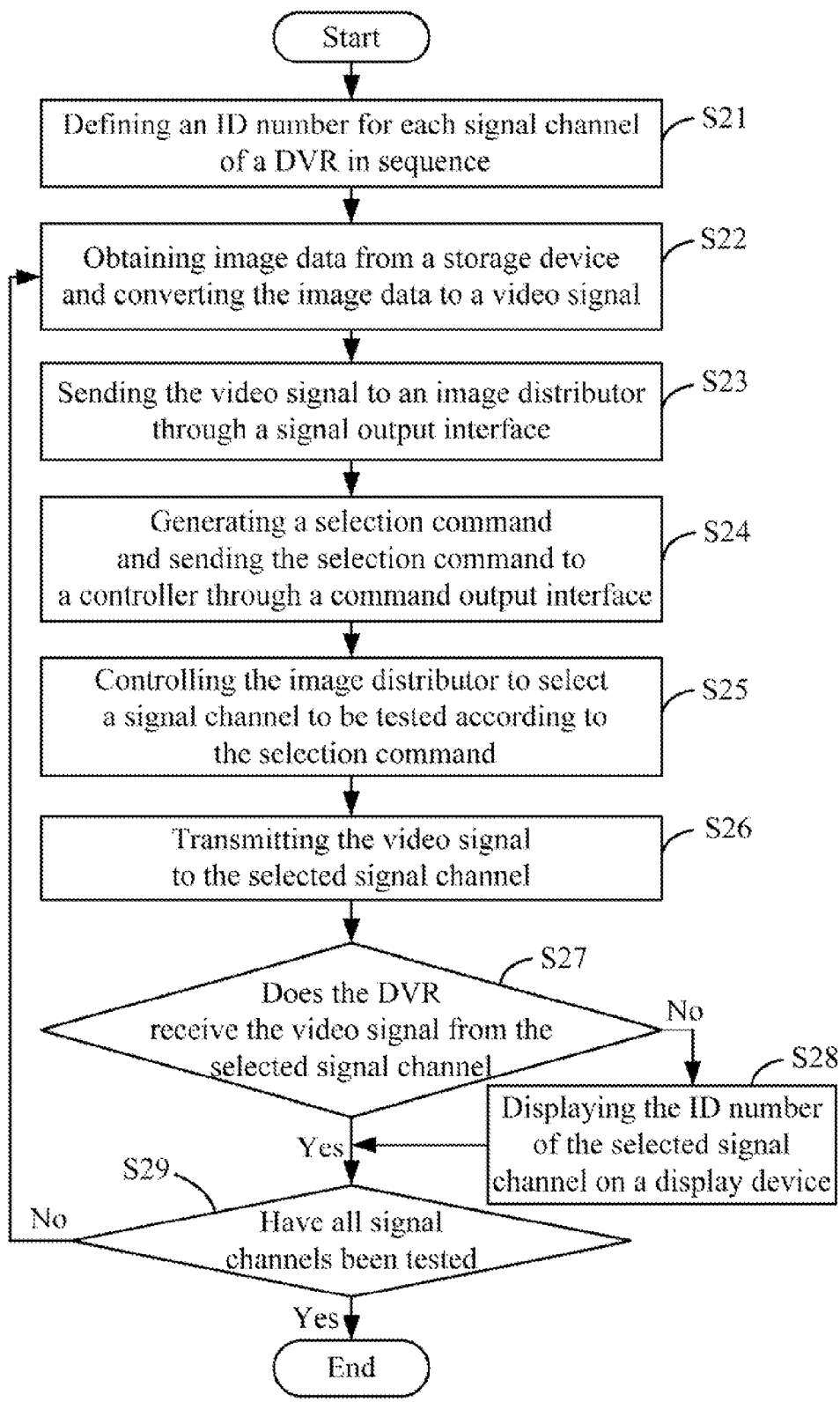
FIG. 2 is a flowchart of one embodiment of a method for testing multiple signal channels of a digital video recorder using the apparatus of FIG. 1.

FIG. 2 is a flowchart of one embodiment of a method for testing multiple signal channels of the DVR 1 using the apparatus 100 of FIG. 1. In the embodiment, the method can test performance of the signal channels of the DVR 1, and displays an ID number of a signal channel on the display device 4 when the signal channel cannot perform image transmission function properly.

In block S21, the image detection module 101 defines an ID number for each of the signal channels of the DVR 1 in sequence, for example, each of the signal channels is denoted by S1, S2, S3, S4, . . . , and Sn respectively.

In block S22, the signal generation module 102 obtains image data from the storage device 11, and converts the image data to a video signal. As mentioned above, the storage device 11 stores the image data having different image formats, such as a National television standards committee (NTSC) format, or a phase alteration line (PAL) format.

In block S23, the signal generation module 102 sends the video signal to the image distributor 3 through the signal output interface 12.

In block S24, the command generation module 103 generates a selection command for selecting a signal channel to be tested, and send the selection command to the controller 2 through the command output interface 13. For example, if the first signal channel S1 needs to be tested, the generating module 103 may generate a first selection command for selecting the first signal channel S1 to be tested, and sends the first selection command to the controller 2.

In block S25, the controller 2 controls the image distributor 3 to select a signal channel to be tested from the signal channels according to the selection command. For example, the image distributor 3 selects the first signal channel S1 according to the first selection command, and selects the second signal channel S1 according to the second selection command. In block S26, the image distributor 3 sends the video signal to the selected signal channel after the signal channel is selected.

In block S27, the image detection module 101 detects whether the DVR 1 receives the video signal from the selected signal channel. If the DVR 1 does not receive the video signal from the selected signal channel, block S28 is implemented. If the DVR 1 receives the video signal from the selected signal channel, block S29 is implemented.

In block S28, the display module 104 displays the ID number of the selected signal channel on the display device, to indicate that the signal channel cannot perform image transmission function properly.

In block S29, the image detection module 101 determines whether all of the signal channels have been tested according to the ID numbers. In one embodiment, the image detection module 101 detects the ID number of a signal channel to determine whether the signal channel has been tested. If any signal channel has not been tested, block S22 is repeated. If all of the signal channels have been tested, the flow ends.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A digital video recorder (DVR), being connected with a controller and an image distributor, the DVR comprising:
   at least one processor;
   a storage device for storing image data; and
   a channel test unit stored in the storage device and being executable by the at least one processor, the channel test unit comprising:
   a command generation module operable to generate a selection command, and send the selection command to the controller for controlling the image distributor to select a signal channel to be tested from a plurality of signal channels of the DVR, wherein the image distributor comprises a first input port, a second input port, and a plurality of output ports, the first input port is switched to each of the output ports that connects to the selected signal channel, and the controller controls the image distributor through the second input port;
   a signal generation module operable to obtain the image data from the storage device, convert the image data to a video signal, and send the video signal to the selected signal channel through the image distributor; and
   a display module operable to display an ID number of the selected signal channel on a display device when the DVR does not receive the video signal from the selected signal channel.

2. The DVR according to claim 1, wherein the channel unit further comprises an image detection module operable to define an ID number for each of the signal channels in sequence, detect whether the DVR receives the video signal from each of the signal channels, and determine whether all of the signal channels have been tested by detecting the ID number of each of the signal channels.

3. The DVR according to claim 1, further comprising a signal output interface and a command output interface.

4. The DVR according to claim 3, wherein the command output interface is an RS-232 interface, and the signal output interface is a USB interface.

5. The DVR according to claim 3, wherein the DVR connects to the controller through the command output interface, and connects to the image distributor through the signal output interface.

6. The DVR according to claim 1, wherein the first input port is used for receiving the video signals from the DVR, the second input port is used for receiving the selection command from the controller, and the output port is used for outputting the video signals to the selected signal channel.

7. The DVR according to claim 1, wherein the storage device stores the image data having a national television standards committee (NTSC) format or a phase alteration line (PAL) format.

8. A method for testing signal channels of a digital video recorder (DVR), the method comprising:
   defining an ID number for each signal channel of the DVR in sequence;
   obtaining image data from a storage device, and converting the image data to a video signal;
   sending the video signal to an image distributor through a signal output interface of the DVR, wherein the image distributor comprises a first input port, a second input port, and a plurality of output ports, and the first input port is switched to each of the output ports that connects to the selected signal channel;
   generating a selection command, and sending the selection command to a controller through a command output interface of the DVR, wherein the controller controls the image distributor through the second input port;

controlling the image distributor to select a signal channel to be tested from the signal channels according to the selection command;

sending the video signal to the selected signal channel using the image distributor;

displaying the ID number of the selected signal channel on a display device when the DVR does not receive the video signal from the selected video channel; and repeating the obtaining step to the displaying step when the DVR receives the video signal from the selected video channel, until all of the signal channels have been tested.

9. The method according to claim 8, wherein the first input port is used for receiving the video signal from the DVR, the second input port for is used receiving the selection command from the controller, and the output port is used for outputting the video signal to the selected signal channel.

10. The method according to claim 8, wherein the command output interface is an RS-232 interface, and the signal output interface is a USB interface.

11. The method according to claim 8, wherein image data comprise national television standards committee (NTSC) format data or phase alteration line (PAL) format data.

12. A non-transitory storage medium having stored thereon instructions that, when executed by a least one processor, to perform a method for testing signal channels of a digital video recorder (DVR), the method comprising:

defining an ID number for each signal channel of the DVR in sequence;

obtaining image data from a storage device, and converting the image data to a video signal;

sending the video signal to an image distributor through a signal output interface of the DVR, wherein the image distributor comprises a first input port, a second input port, and a plurality of output ports, and the first input port is switched to each of the output ports that connects to the selected signal channel;

generating a selection command, and sending the selection command to a controller through a command output interface of the DVR, wherein the controller controls the image distributor through the second input port;

controlling the image distributor to select a signal channel to be tested from the signal channels according to the selection command;

sending the video signal to the selected signal channel using the image distributor;

displaying the ID number of the selected signal channel on a display device when the DVR does not receive the video signal from the selected video channel; and repeating the obtaining step to the displaying step when the DVR receives the video signal from the selected video channel, until all of the signal channels have been tested.

13. The non-transitory storage medium according to claim 12, wherein the first input port is used for receiving the video signals from the DVR, the second input port is used for receiving the selection command from the controller, and the output port is used for outputting the video signals to the selected signal channel.

14. The non-transitory storage medium according to claim 12, wherein the command output interface is an RS-232 interface, and the signal output interface is a USB interface.

15. The non-transitory storage medium according to claim 12, wherein image data comprise national television standards committee (NTSC) format data or phase alteration line (PAL) format data.

* * * * *